United States Patent [19]
Fink et al.

[11] Patent Number: 5,601,300
[45] Date of Patent: Feb. 11, 1997

[54] VEHICLE FRAME MOUNTING BRACKET SYSTEM

[75] Inventors: Raymond W. Fink, Elkhart; Malcom E. Pendleton, Goshen; H. John Veenstra, Middlebury, all of Ind.

[73] Assignee: Kenco/Williams, Inc., Middlebury, Ind.

[21] Appl. No.: 251,794

[22] Filed: May 31, 1994

[51] Int. Cl.$^6$ ........................................................ B60R 3/00
[52] U.S. Cl. ........................................................ 280/166
[58] Field of Search .................................. 280/163, 166, 280/169, 164.1, 164.2, 770, 762; 293/128; 296/207, 62, 63, 75

[56] References Cited

U.S. PATENT DOCUMENTS

| | | | |
|---|---|---|---|
| 3,329,443 | 7/1967 | Lowder et al. | 280/166 |
| 3,980,319 | 9/1976 | Kirkpatrick | 280/166 |
| 4,017,093 | 4/1977 | Stecker, Sr. | 280/163 |
| 4,200,303 | 4/1980 | Kelly | 280/166 |
| 4,935,638 | 6/1990 | Straka | 280/163 |
| 4,982,974 | 1/1991 | Guidry et al. | 280/166 |
| 5,193,829 | 3/1993 | Holloway et al. | 280/163 |

*Primary Examiner*—Richard M. Camby
*Attorney, Agent, or Firm*—Barnes, Kisselle, Raisch, Choate, Whittemore & Hulbert, P.C.

[57] ABSTRACT

A bracket assembly for attachment to a motor vehicle frame member is adapted to support a frame mounted vehicle accessory, such as a step or running board. The bracket assembly comprises a pair of primary brackets, a pair of connecting pins, a support member, a mounting bracket, and a leveling bracket. The primary brackets define surfaces engaging a vehicle frame member without drilling. The connecting pins extend between and connect the primary brackets. The support member is substantially vertical and is supported by the primary brackets and connecting pins. The mounting bracket extends substantially horizontally from the support member to the accessory. The leveling bracket is fixed to the mounting bracket at a point proximate to the accessory and is fixed to the support member at a point separate from where the mounting bracket attaches to the support member.

16 Claims, 4 Drawing Sheets

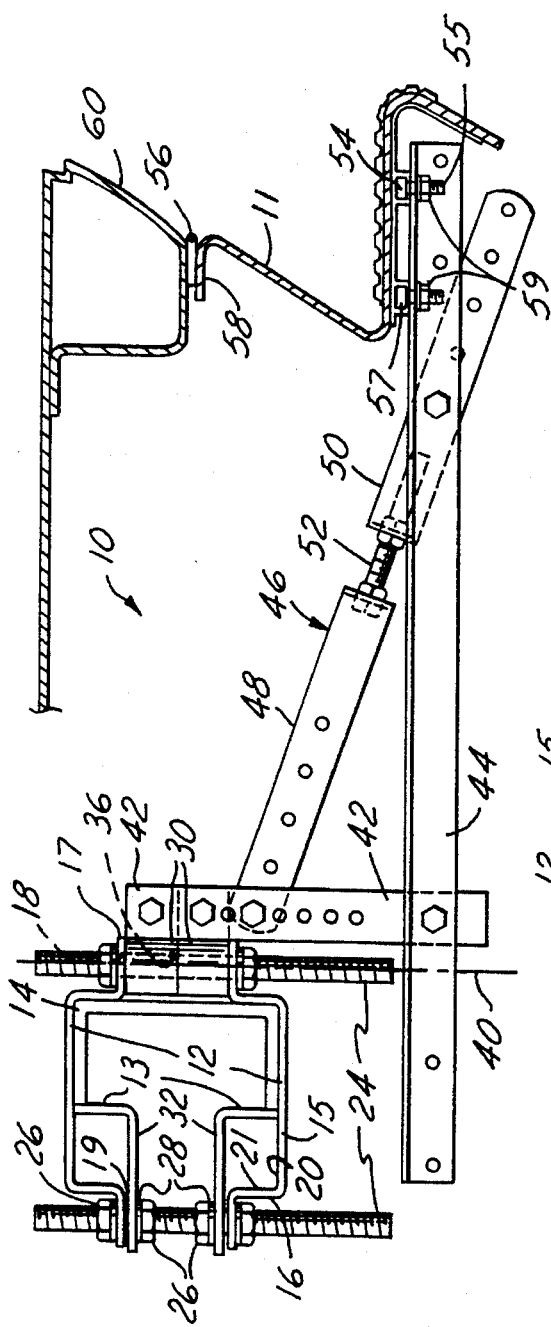
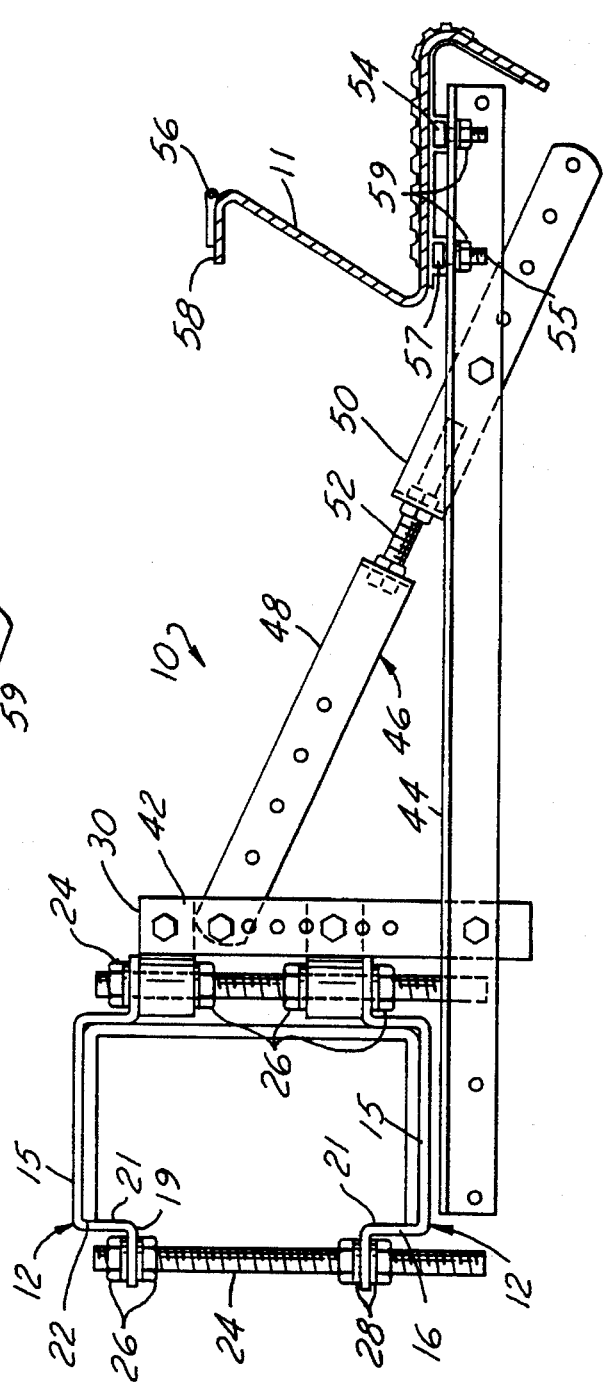

VEHICLE FRAME MOUNTING BRACKET SYSTEM

TECHNICAL FIELD

The present invention relates generally to mounting brackets attaching to a frame member of a motor vehicle and, more particularly, to brackets used to support accessories from the frame member in a cantilevered fashion.

BACKGROUND OF THE INVENTION

Typical frame mounted accessories, particularly vehicle steps and running boards, have at least one bracket fixed directly to a frame member by fasteners passing therethrough. An example of such a mounting is shown in U.S. Pat. No. 5,193,829 issued to Holloway, et al on Mar. 16, 1993. Drilling holes in the frame member to mount a bracket sometimes requires installation equipment not readily available to many individuals wanting to install such accessories. Additionally, drilling holes in the frame member of a vehicle may void certain warranty protections offered by the manufacturer of that vehicle. Brackets configured with apertures for aligning with existing apertures in the frame member of the vehicle may allow the mounting of brackets to the frame member without drilling the frame member in some cases. However, some drilling is typically necessary if the location of the bracket on the frame member must be changed. Also, such brackets only eliminate drilling for a specific model of vehicle for which they were designed. Different brackets would be needed for each vehicle model.

Some brackets not requiring drilling of the frame member can be found. U.S. Pat. No. 4,017,093 issued to Stecker, Sr., on Apr. 12, 1977 shows a step for a vehicle supported by brackets which clamp to the frame member. Such clamping devices have the potential disadvantage of allowing the bracket to slip downward if there should be any loss of clamp load or a decrease in the coefficient of friction between the clamp and the frame member. Changes in the coefficient of friction can occur at elevated temperatures when the frame member is coated with certain anti-corrosive compounds.

Yet another bracket configuration, shown in U.S. Pat. No. 3,887,217 issued to Thomas on Jun. 3, 1975, has hook elements used in combination with a plate to engage a frame member. This particular configuration has the apparent disadvantage of requiring a unique plate size for each different vehicle frame member with which it is to be used. A different plate member would be required to establish a different distance between the hook members. An additional disadvantage of this configuration is that such hook members could only be employed with a frame member having an open back section. Such hooks would be ineffective in retaining a bracket to the frame member where the frame member is a completely closed box section.

It is desired to provide brackets for supporting frame mounted accessories, such as steps and the like, which accommodate variable fore-aft positioning and mounting of the brackets on the frame without drilling. It is also desired to provide brackets which accommodate relative fore-aft positioning of the accessory relative to the mounted bracket. It is further desired to provide brackets having a vertical or elevational adjusting means for precisely positioning the accessory relative to the vehicle body.

The present invention is directed to overcoming one or more of the problems as set forth above.

SUMMARY OF THE INVENTION

In one aspect of the present invention, a bracket assembly is disclosed which attaches to a motor vehicle frame member for supporting a cantilevered accessory, and which obviates the need for drilling the frame while at the same time securely affixes the accessory to the frame at substantially any longitudinal, or fore-aft, location on the frame member. This assembly comprises a pair of primary brackets, a fastener assembly, a support member, a mounting bracket, and a leveling bracket. The primary brackets define U-shaped openings adapted to accept a vehicle frame member. The fastener assembly extends between and connects the primary brackets.

In another aspect of the present invention, a universal fit, no drill bracket assembly is attached to a motor vehicle frame member for supporting a cantilevered accessory, which includes means providing for fore and aft longitudinal adjustment of the accessory relative to the bracket assembly on the frame member. This assembly comprises a frame bracket, a pin, a first pivot member, a support member, a mounting bracket, and a leveling bracket. The frame bracket is fixed to the frame member. The pin is supported by the frame bracket. The first pivot member is disposed over the pin for pivoting thereabout. The support member is mounted to the pivot member in a substantially vertical position for pivoting with the pivot. The mounting bracket extends substantially horizontally from the support member to the accessory. The leveling bracket is fixed to the mounting bracket at a point proximate to the accessory and is fixed to the support member at a point separate from where the mounting bracket attaches to the support member.

In yet another aspect of the present invention, a bracket assembly attaches to a motor vehicle frame member for supporting a cantilevered accessory, which includes means for providing elevational adjustment of the accessory. This bracket assembly comprises a frame bracket, a mounting bracket, and a leveling bracket fixed to the mounting bracket. The frame bracket engages the frame member. The support member is supported in a substantially vertical position by the frame bracket. The mounting bracket extends substantially horizontally from the support member to the accessory. The leveling bracket has a first end portion and a second end portion and a threaded adjuster connecting the first end portion with the second end portion. The first end portion is connected to the support member at a point separate from the mounting bracket and the second end portion is connected to the mounting bracket, thereby forming an angle therebetween and sustaining a principal share of any vertical loads induced by the accessory.

The present invention provides a bracket assembly which mounts to a vehicle frame member without drilling the frame member and without passing any fasteners through the frame member. The bracket assembly can be located at nearly any position along the length of a frame member. A pivoting feature of the bracket assembly provides superior freedom in longitudinally locating bracket assemblies on the frame member of the vehicle. Adjustment capabilities of the leveling bracket permit precise positioning of accessories such as vehicle steps and running boards relative to the vehicle body.

BRIEF DESCRIPTION OF THE DRAWINGS

FIG. 1 is a side view of the bracket assembly configured for use with a small frame member.

FIG. 2 is a side view of a bracket assembly configured for use with a large frame member.

DESCRIPTION OF THE PREFERRED EMBODIMENT

Figure 3:
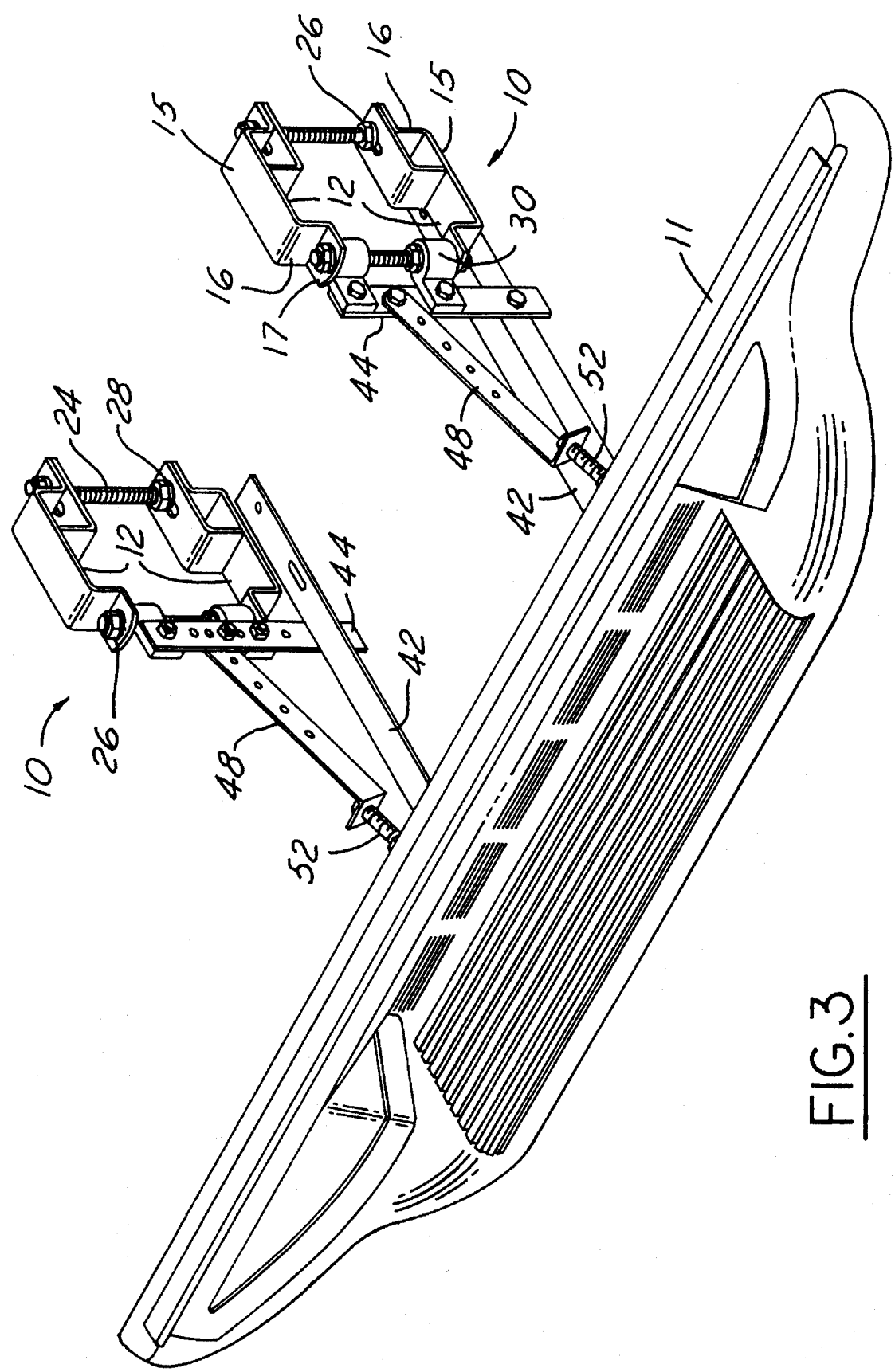
FIG. 3 is a perspective view of a vehicle entry step and related mounting bracket assemblies.
Figure 4:
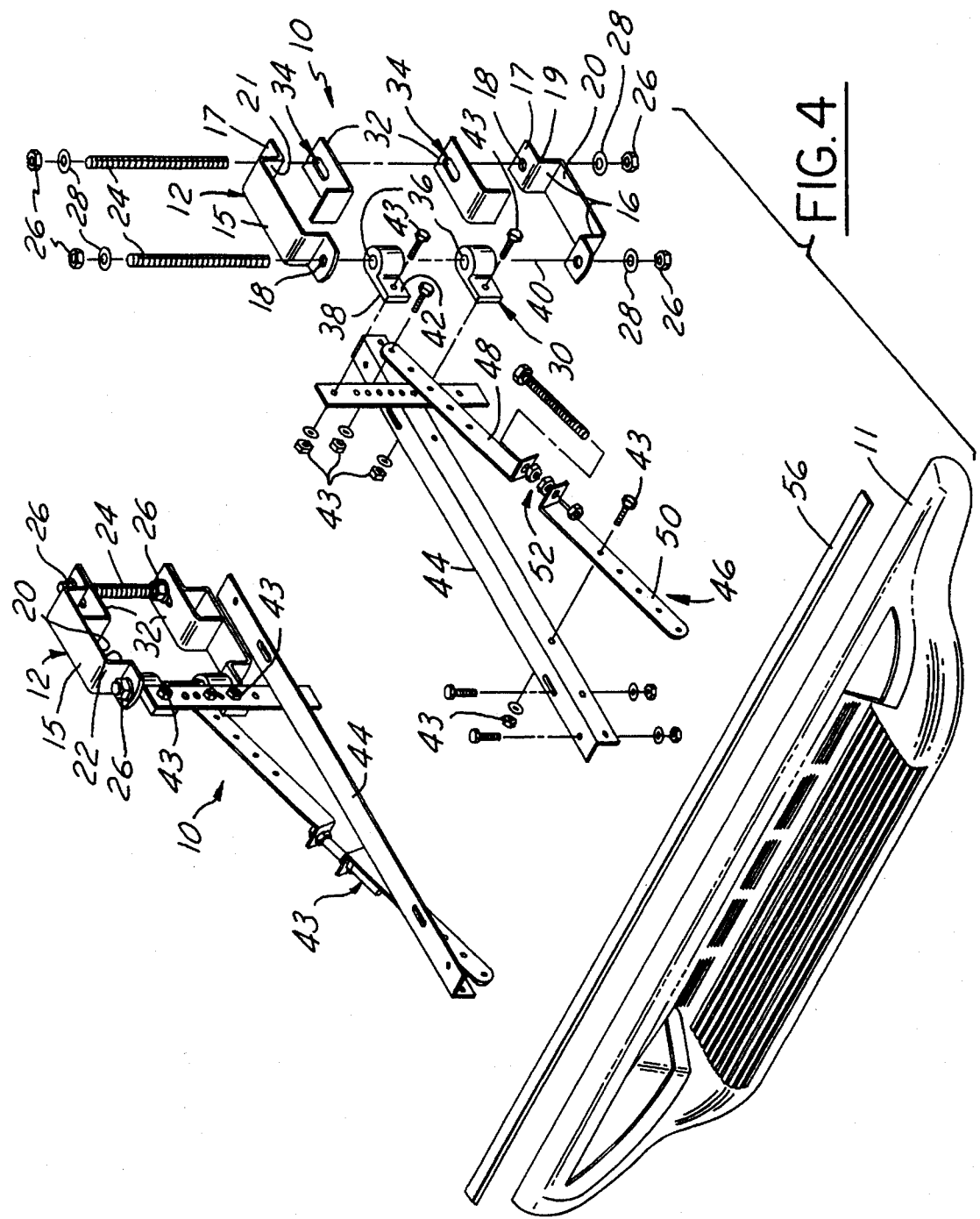
FIG. 4 is a view similar to FIG. 3, but in exploded form.
Figure 5:
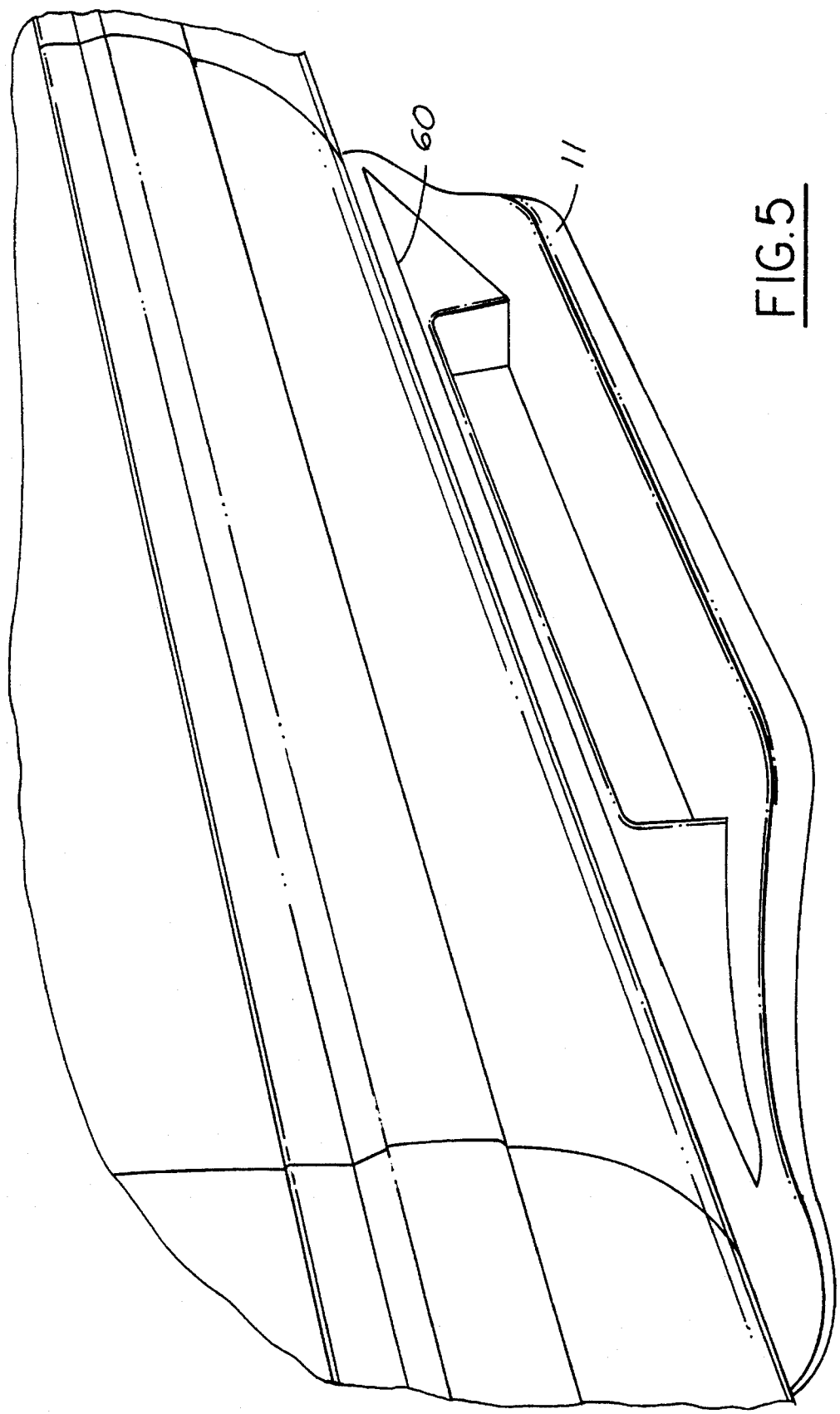
FIG. 5 is a perspective view of a vehicle entry step mounted beneath a vehicle entry door.

FIGS. 1 through 4 show a bracket assembly 10 and a vehicle entry step 11 supported by a pair of bracket assemblies 10. FIG. 5 shows the entry step 11 mounted in position beneath a vehicle entry door, using the bracket assembly 10. The bracket assembly 10 is equally suited for use with running boards (not shown) as well as steps 11. Running boards are characteristically longer than steps 11, requiring, for example, four bracket assemblies 10 instead of just two. The bracket assembly 10 includes a pair of identical primary brackets 12 with opposed U-shaped openings 13 adapted to receive a vehicle frame member 14 therebetween. As disclosed herein, the vehicle frame member 14 possesses three sides, however it may also be four sided so as to form a closed box when viewed in cross-section.

The primary brackets 12 are U-shaped. An elongated base portion 15 has a pair of upright legs 16 extending therefrom at a right angle thereto. A flange 17 having an aperture 18 therethrough extends outward from an end 19 of each of the legs 16 parallel to the base portion 15. The base portion 15 and legs 16 define bracket surfaces 20 and 21 respectively which engage at least two corresponding surfaces of the frame member 14. An edge 22 of the frame member can define one of the frame surfaces.

A pair of threaded rods 24 pass through the apertures 18 in the flanges 17 of the primary brackets 12 placed over and under the vehicle frame member 14. These threaded rods 24 serve as spaced connecting rods, or pins 24 between the primary brackets 12 on opposite sides of the frame member 18. Nut 26 and lock washer 28 combinations serve with the threaded rods 24 to position and clamp the primary brackets 12 to the frame member 14. The clamping action precludes movement along the frame member 14. Rotational movement about the frame member 14 in response to torsional loading of the bracket assembly 10 is inhibited principally by the geometry of the primary brackets 12. The nuts 26, lock washers 28, and rods 24 can be characterized as a fastener assembly. The primary brackets 12 together with the fastener assembly can be characterized as a primary bracket assembly for mounting to the frame member 14.

On the more inboard of the threaded rods 24, that is the rod 24 more distal to an outside of the vehicle as shown in FIG. 1, two nuts 26 and lock washers 28 are disposed between the flanges 17 of the primary brackets 12. The nuts 26 and lock washers 28 serve as a spacer element between the flanges 17, defining engaging surfaces between the flanges 17. On a more outboard threaded rod 24, a pair of pivot members 30 are disposed between the flanges 17.

Two L-shaped brackets 32 are also employed in the embodiment of FIG. 1. Each bracket 32 has a short leg and a long leg with a slot 34 in the longer leg. The long legs are located on the first threaded rod 24 with the threaded rod 24 passing through the slot 34. The long legs are sandwiched between the inner nut 26 and lock washers 28 and the flanges 17. The short leg is disposed in the U-shaped opening 13 which effectively reduces the width of the U-shaped opening 13.

The pivot members 30 each have an aperture 36 sized to provide a clearance relationship with the threaded rod 24 and having a mounting surface 38 (FIG. 4) which is substantially perpendicular to an axis 40 of the pivot aperture 36.

A support member 42 is mounted to the mounting surface 38 of the pivot members 30. The support member 42 is held in a substantially vertical position.

A mounting bracket 44 extends substantially horizontally from the support member 42 to the vehicle step 11. The support member 42 has a plurality of apertures facilitating both the attachment of the support member 42 to the pivot members 30, and the attachment of the mounting bracket 44 thereto, both of such attachments being accomplished by bolt, nut, washer combinations 43. Typically, the mounting bracket 44 is attached beneath the lower of the two pivot members 30. The mounting bracket 44 also has a plurality of holes and slots facilitating its mounting between the vehicle frame member 14 and the accessory vehicle step 11.

A leveling bracket, or adjusting bracket assembly 46, has a first end portion 48 fixed to the support member 42 by bolt, nut, washer combinations 43. The first end portion 48 has a plurality of holes allowing the selective positioning of the first end portion relative to the support member 42. The leveling bracket 46 also has a second end portion 50 fixed to the mounting bracket 44 by bolt, nut, washer combinations 43. The second end portion 50 also has a plurality of holes allowing the selective positioning of the second portion 50 relative to the mounting bracket 44. A threaded adjuster 52 connects the first end portion 48 with the second end portion 50. Turning of the threaded adjuster 52 vertically displaces the vehicle step 11 relative to the vehicle frame member 14 for precise vertical positioning of the step 11. The threaded adjuster 52 can be in the form of a hex head bolt with a combination of nuts as shown in the Figures, or alternatively by a turnbuckle or other adjusting means. The step 11 has a pair of substantially C-shaped bolt channels 54 integrated into a bottom surface of the step 11. The use of bolt channels 54 allows fore and aft adjustment of the step position relative to the vehicle body independent of the location of the brackets. Accessory retention bolts 55 have either square or hex heads 57 slidably captured in the bolt channels 54 allowing them to freely translate longitudinally within the slots yet not rotate when torque is applied to the bolts 55. The bolts 55 pass through apertures in the mounting bracket 44 and are secured by nuts 59 engaging the bolt threads. A strip of trim bulbing 56 is taped to the step 11 and then wedged between a lower edge of a rocker panel 60 of the vehicle and a top edge 58 of the step 11 which is positioned immediately below and abuts the rocker panel 60.

The embodiment shown in FIG. 2 is essentially identical to the embodiment shown in FIG. 1 with some minor variations. These variations are attributable to the use of common primary brackets 12 for both vehicles which have frame members possessing large cross-sections as shown in FIG. 2 and small cross-sections as shown in FIG. 1. The L-shaped brackets 32 of FIG. 1 are made unnecessary by the larger frame member shown in FIG. 2. However, because of the greater distance between the primary brackets 12, it is necessary to employ an extra pair of nuts 26 and lock washers 28 between the pivot members 30 to achieve the desired spacing of the pivot members 30 for supporting the primary brackets 12.

A principal advantage of the bracket assembly described herein is its ease of installation. Another advantage of the present invention is provided by the wide range of adjustment available with the bracketry of this invention. The invention provides an essentially universal bracket device which will mount to the frame of most light duty trucks employing a full frame chassis.

The bracket assembly 10 is installed as follows. A nut 26 and a lock washer 28 are placed on an end of each of two threaded rods 24. One threaded rod and nut assembly is placed in each aperture 10 of the flanges 17 of the bracket 12. The bracket 12 and the rods 24 are placed over the frame member 14. One of the L-shaped brackets 32 is placed over the rod 24. A nut 26 and lock washer 28 are run up against the L-shaped bracket 32 to retain it. Yet another nut 26 is run up the same rod 24. Two pivot members 30 are slid up the outboard rod 24. A lock washer 28 and a second L-shaped bracket 32 are placed over the inboard rod 24. A second of the primary brackets 12 is then placed over both the rods 24 and pushed up to contact the L-shaped bracket 32 and the pivot member 30. Nuts 26 and lock washers 28 are run up each of the rods 24 to retain the lower primary bracket 12. Nuts 26 and washers 28 serve as the spacer element on the inboard rod 24. The pivot members 30 serve as the spacer element on the outboard rod 24. The bracket assembly 10 of FIG. 2 is assembled in the same fashion except that an additional pair of nuts 26 and lock washers 28 are disposed between the pivot members 30 for the purpose of spacing them apart.

The support member 42 is mounted to mounting surfaces 38 of the pivot members 30 by bolts passing therethrough. The first end portion 48 of the leveling bracket 46 is bolted to the support member 42 at a point as high as possible. The hex head bolt and nuts serving as the threaded adjuster 52 are used to link the first end portion 48 with the second end portion 50 of the leveling bracket 46. These operations are repeated for a second bracket assembly 10 used to support the vehicle step 11.

Two mounting brackets 44 are fixed to the vehicle step 11 as follows. Heads 57 of the bolts 55 are placed in the bolt channels 54. The mounting brackets 44 are positioned to align apertures therein with the bolts 55 extending from the step 11. Lock washers and nuts are placed over the bolts 55 and loosely run up against the mounting bracket 44. The assembled step 11 and brackets 44 are lifted as a unit into position next to the vehicle. The mounting brackets 44 are bolted to the support members 42 near the lower ends of the support members 42. The second portion 50 of the leveling bracket 46 is bolted to the mounting bracket 44 at a point relatively close to the step 11. The trim bulbing 56 is adhesively fixed to the top edge 58 of the step 11. Fasteners are loosened as necessary to position the step 11 in the desired mounting location. Fasteners are then suitably tightened. The step 11 is leveled to a horizontal position by loosening or tightening the threaded adjuster 52. If adjustment beyond that available with the threaded adjuster 52 is required, the second portion 50 of the leveling bracket 46 can be moved to a different location on the mounting bracket 44. The step 11 is positioned such that the trim tubing 56 conceals any small gaps between the top edge 58 of the step 11 and the rocker panel 60 of the vehicle.

It should be readily evident that such a bracket assembly 10 could be used equally well with either running boards or molded or formed vehicle steps 11. The principal difference between the step 11 and a running board is the greater length of the running boards relative to steps, requiring additional brackets along the frame member 14.

Other aspects, objects and advantages of this invention can be obtained from a study of the drawings, the disclosure and the appended claims.

We claim:

1. A combination of a motor vehicle frame member and a bracket assembly adapted to be attached to the motor vehicle frame member for supporting an accessory on the vehicle, comprising:

a primary bracket assembly mounted on the vehicle frame member;

a mounting bracket extending laterally from the frame and upon which the accessory is mounted;

a leveling bracket assembly of selectively adjustable length connected to the primary bracket assembly and to end of the mounting bracket distal to the primary bracket assembly, four adjusting the vertical position of the end of the mounting bracket distal to the primary bracket assembly;

a substantially vertical support member supported by the primary bracket assembly;

said mounting bracket extending substantially horizontally from the support member to the accessory; and said leveling bracket assembly of selectively adjustable length having a first end portion with a plurality of holes for selective positioning and a second end portion with a plurality of holes for selective positioning; and a threaded adjuster connecting the first end portion with the second end portion wherein turning of the threaded adjustor displaces the accessory relative to the frame member wherein the first end portion is connected to the support member at a point separate from the mounting bracket and the second end portion is connected to the mounting bracket, thereby forming an angle therebetween and sustaining a principal share of any vertical loads induced by the accessory.

2. A combination of a frame member and a bracket assembly as claimed in claim 1 further comprising:

a pin supported in a substantially vertical position by the primary bracket assembly; and a first pivot member having a pivot axis and defining an aperture centered on the pivot axis and sized to provide a clearance relationship with the pin and having a mounting surface substantially parallel to the pivot axis, disposed on the pin for pivoting thereabout wherein the support member is fixed to the mounting surface for pivoting therewith.

3. A combination of a frame member axis and a bracket assembly as claimed in claim 2 further comprising a second pivot member substantially identical to the first pivot member and disposed on the pin for pivoting thereabout and fixed to the support member.

4. A bracket assembly adapted to be attached to a motor vehicle frame member for supporting an accessory on the vehicle, comprising:

a primary bracket assembly defining an opening;

a primary bracket assembly defining an opening;

a mounting bracket extending laterally from the primary bracket assembly; and a leveling bracket having an infinitely variable length fixed on a first end to the primary bracket assembly at a location vertically offset from the mounting bracket and fixed on a second end to the mounting bracket at a location distal to the primary bracket assembly thereby forming an angle with respect to the mounting bracket and sustaining a principal share of a vertical load exerted on the mounting bracket distal to the primary bracket, and wherein bracket assembly further includes:

a pin supported by the primary bracket assembly;

a first pivot member having a pivot axis and defining an aperture centered on the pivot axis and sized to provide a clearance relationship with the pin and having a mounting surface substantially parallel to the pivot axis and disposed on the pin for pivoting thereabout;

a substantially vertical support member fixed to the mounting surface of the first pivot member for pivoting therewith;

the mounting bracket fixed to and extending substantially horizontally from the support member to the accessory; and the leveling bracket fixed to the support member wherein the mounting bracket and the leveling bracket pivot together with the vertical support member about the pivot axis.

5. A bracket assembly as claimed in claim 4 further comprising a second pivot member substantially identical to the first pivot member and disposed over the pin for pivoting thereabout and fixed to the support member.

6. A bracket assembly as claimed in claim 4, wherein the second pivot member is selectively spaced from the first pivot member with a spacer member disposed therebetween.

7. A bracket assembly adapted to attach to a motor vehicle frame for supporting a cantilevered accessory comprising:

a pair of primary brackets, each of the primary brackets having at least three planar bracket surfaces with two surfaces in parallel and normal to a third surface defining a U-shape with an open side of each bracket facing the other; and a fastener assembly for securing the primary brackets to each other.

8. A bracket assembly as claimed in claim 7, wherein the primary brackets are essentially identical in shape.

9. A bracket assembly as claimed in claim 7 further characterized by:

the primary brackets having opposed U-shaped opening sized to accept vehicle frame member;

a fastener assembly including a pair of connecting rods extending between and connecting the primary brackets and thereby clamping the frame member;

a substantially vertical support member supported by the primary brackets and connecting rods;

a mounting bracket extending substantially horizontally from the support member to the accessory; and a leveling bracket fixed to the mounting bracket at a point distal to the primary brackets and fixed to the support member at a point separate from a point of attachment of the mounting bracket thereby forming an angle thereto and sustaining a principal share of any vertical loads induced by the accessory.

10. A bracket assembly as claimed in claim 7 further characterized by:

the primary brackets having outwardly extending flanges with an aperture through each flange; and connecting rods being disposed in the apertures of the primary brackets thereby enabling the primary brackets and connecting rods to circumscribe a predetermined range of frame member sizes.

11. A bracket assembly as claimed in claim 10 further characterized by at least one of the connecting rods being threaded along most of its length and having at least two nuts threaded thereon defining a spacer element between the flanges of the primary brackets and defining engaging surfaces spaced a distance apart approximately equal to a desired distance between flanges and sustaining a reactive compressive load induced by clamping the primary brackets over the frame member thereby reducing transfer of compressive loading to the frame member.

12. A bracket assembly as claimed in claim 11 further comprising an L-shaped bracket having a short leg and a long leg with a slot in the long leg disposed between the spacer element and the primary bracket flange with the bolt passing through the slot and the short leg disposed in the U-shaped opening for effectively reducing a width of the U-shaped opening thereby accommodating mounting of the bracket assembly to a smaller frame member.

13. A bracket assembly as claimed in claim 9 further comprising a first pivot member having a pivot axis and defining an aperture centered on the pivot axis and sized to provide a clearance relationship with the rod and having a mounting surface substantially parallel to the pivot axis and disposed on the bolt for pivoting thereabout wherein the support member is fixed to the mounting surface for pivoting therewith.

14. A bracket assembly as claimed in claim 13 further comprising a second pivot member substantially identical to the first pivot member and disposed on the rod for pivoting thereabout and fixed to the support member.

15. A bracket assembly as claimed in claim 9 further characterized by the leveling bracket having a first end portion with a plurality of holes for selective positioning relative to the support member and a second end portion with a plurality of holes for selective positioning relative to the mounting bracket and having a threaded adjuster connecting the first end portion with the second end portion wherein turning of the threaded adjuster displaces the accessory relative to the frame member.

16. A bracket assembly as claimed in claim 9, wherein the accessory has an integral substantially C-shaped channel disposed substantially parallel to the frame member and across at least two mounting brackets and slidably capturing a head of an accessory retention bolt with the accessory retention bolt passing through an aperture in the mounting brackets thereby permitting longitudinal adjustment of the accessory relative to the frame member.

* * * * *